United States Patent

[11] 3,556,143

| [72] | Inventor | Francis G. Nally<br>5201 W. 65th Place, Mission, Kans. 66222 |
|---|---|---|
| [21] | Appl. No. | 750,089 |
| [22] | Filed | Aug. 5, 1968 |
| [45] | Patented | Jan. 19, 1971 |

[54] BEER-DISPENSING FAUCET
3 Claims, 8 Drawing Figs.

[52] U.S. Cl. ................................................. 137/589,
137/625.26, 251/260
[51] Int. Cl. ........................................................ B67d 3/00
[50] Field of Search ........................................... 137/589,
596.17, 533.17, 625.26; 251/231, 137, 129, 138,
133, 259, 260, 318, 323, 324, 325

[56] References Cited
UNITED STATES PATENTS

| 1,382,080 | 6/1921 | Haas et al. | 251/260 |
| 1,584,587 | 8/1925 | Yardley | 251/260X |
| 2,565,457 | 8/1951 | Spender | 251/260X |
| 2,833,508 | 5/1958 | Bydalek et al. | 251/138X |
| 3,187,770 | 6/1965 | Plamann | 137/589 |
| 3,380,629 | 4/1968 | Kontra et al. | 251/129X |
| 3,423,064 | 1/1969 | Harland et al. | 251/324X |

*Primary Examiner*—M. Cary Nelson
*Assistant Examiner*—R. B. Rothman
*Attorney*—Scofield, Kokjer, Scofield & Lowe

ABSTRACT: A beer-dispensing faucet; a beer-dispensing faucet designed for automatic operation by a solenoid so automatic equipment may be used to dispense the beer from the faucet without the bartender utilizing a hand lever.

PATENTED JAN 19 1971 3,556,143

INVENTOR
Francis G. Nally

BY Scofield, Kokjer, Scofield & Lowe
ATTORNEYS

3,556,143

BEER-DISPENSING FAUCET

SUMMARY OF THE INVENTION

The patent to Cornelius, U.S. Pat. No. 2,270,932, issued Jan. 27, 1942, for "Faucet" shows a beer dispensing faucet having a hand-operated valve. The instant faucet is an improvement over the Cornelius device.

It is most desirable to provide automatic beer controls or beer-drafting controls for bars for the following reasons:

(1) in order to accurately pour and measure each glass of beer with a uniform head; (2) to count each glass of beer dispensed; (3) to assure control of the quantity draft beer sold by each bartender on his shift; (4) to permit the management to read a meter for each shift and for each day whereby to know exactly the amount of beer sold; (5) to eliminate spillage, overpour, give aways and pilferage; (6) to permit anyone, regardless of experience, to pour a perfect glass of beer; (7) to enable the bartenders to serve two different size glasses of beer from either tap simultaneously; (8) to provide a dispensing function to permit fast and easy topping off of a head; (9) to eliminate the waste factor whereby full profit from each barrel may be assured; (10) to provide that, when a barrel of beer is blown the bartender may press a switch and beer is automatically poured from the other tap. Previously, various automatic beer faucet or dispensing systems have been provided as follows. In a first unit, a surgical tube utilizes a cam arrangement to clamp on said tube to stop flow and release the clamping action to start beer flow. Such requires a new cam system to adjust over a range of 2 to 3 ounces. Another former faucet utilizes a longitudinal cylindrical solenoid to back off the valve for plunger.

Depending upon the type of beer, its coldness (the warmer the stickier) and some other factors, beer faucets have a tendency to stick when not in operation for 12 hours or more. In an automatic faucet, it is necessary to provide a solenoid or power source powerful enough to open the faucet against such stickiness. The instant automatic-dispensing faucet construction here involved has an internal valve construction which permits the use of a rotary solenoid which obviates sticking, prevents rotation of the valve around its longitudinal axis or other malfunction.

Typical subsystems units in an automatic beer control utilizing a faucet of the character described would include, first, a power and counter unit. Such would preferably operate on a 115 volt AC current reduced to 24 volts for safety. Same would have a keyed on-and-off switch, a metering adjustment for the various size glasses or pitchers of beer sealed inside the unit and a counter for registering each glass of beer dispensed. Secondly, associated therewith, would be a switch selector unit which would consist of selector switches for the size glass or pitcher of beer to be dispensed and a head switch. Thus, a typical unit would include a selection for a glass, a pitcher and a head. However, within the unit, such could be adjusted to have two different sizes of glasses and the head, two different sizes of pitchers and the head, or as mentioned, a glass, a pitcher and a head. An actuator switch is further provided which may be operated from floor, wall or shelf. Finally, the beer faucets, comprising the instant invention, replacing the present hand faucets. Such may be operated by actuating either foot or hand switch.

An object of the invention is to provide an automatic beer-dispensing faucet which has no vulnerability at its operating end to the bartender whereby all operation thereof is accomplished only through applied power through an electrical system.

Another object of the invention is to provide an improved valve construction for a beer-dispensing faucet which functions in accurate, powerful opening and closing action in concert with a rotary solenoid without sticking, leaking, varying in travel or jamming.

Another object of the invention is to provide an improved beer-dispensing faucet which is easily assembled and disassembled for cleaning when the beer lines are cleaned.

Another object of the invention is to provide an automatic operating beer-dispensing faucet which provides a smooth pour, without turbulence, which permits the pouring of a perfect glass of beer.

Another object of the invention is to provide an automatic beer-dispensing faucet which utilizes a unique valve and solenoid combination wherein the solenoid is completely protected, in its operating parts, from penetration of the beer dispensed thereinto or therearound.

Another object of the invention is to provide a valve construction for a beer-dispensing faucet which may be utilized in conjunction with an improved housing or faucet housing construction whereby to permit the use of a rotary solenoid therewith without canting, rotating or misaligning of the valve within the faucet over long periods of operation.

Another object of the invention is to provide suitable ventilating means in an automatic beer-dispensing faucet which permit the draining of the faucet after the valve in the faucet is closed, yet which prevents the prevention of outside air into the faucet when same is dispensing beer and the valve therein is open.

Another object of the invention is to provide a cooperating disposing faucet housing and improved valve construction whereby, although a powerful rotary solenoid is employed, the arcuate movement of the shaft of the rotary solenoid is translated into to-and-fro motion of the valve, the valve never canting or getting off center, whereby accurate sharp opening and closing of the valves in the faucet is made possible and, as well, precise ventilation and sealing of the faucet itself is permitted when the valve is closed and opened, respectively.

Another object of the invention is to provide an automatic beer-dispensing faucet which, while readily assembled and disassembled for cleaning purposes or replacement of parts, cannot be reassembled in the wrong manner.

Other and further objects of the invention will appear in the course of the following description thereof.

DRAWINGS

In the drawings, which form a part of the instant specification and are to be read in conjunction therewith, an embodiment of the inventive beer-dispensing faucet is shown and, the various views, like numerals are employed to indicate like parts.

Figure 1:
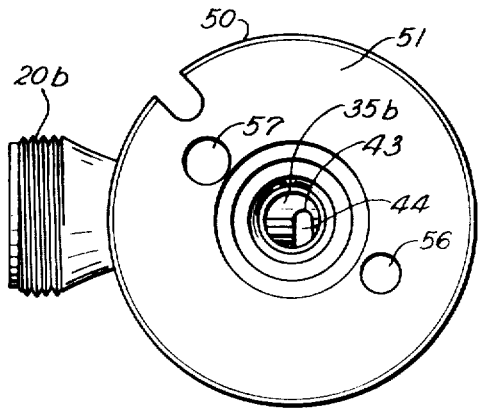
FIG. 1 is a top view of the subject automatic beer-dispensing faucet showing the platform for mounting the solenoid but not including the solenoid shown in FIG. 3.
Figure 2:
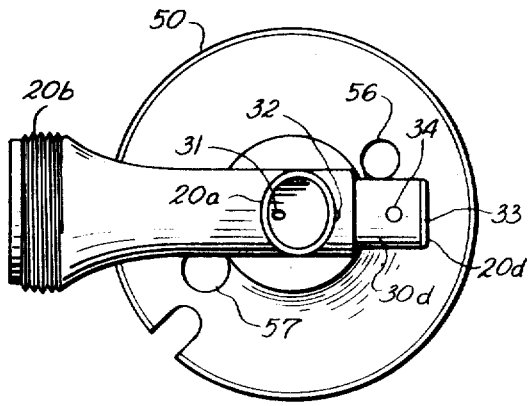
FIG. 2 is a bottom view of the beer-dispensing faucet seen in FIG. 1. In the views of FIGS. 1 & 2, the connection to the beer line is to the left in the views.
Figure 3:
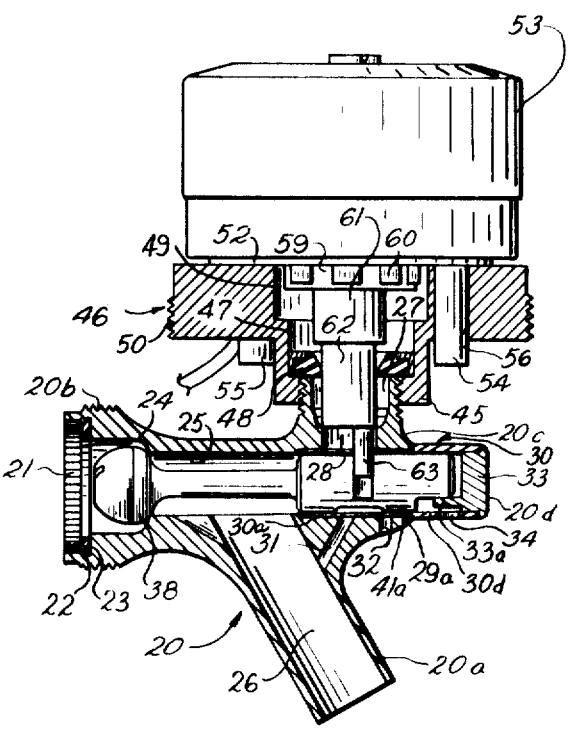

FIG. 3 is a side sectional view of the subject beer-dispensing faucet of FIGS. 1 & 2, but with the operating solenoid in place on the solenoid-receiving platform. The operating plunger or valve is in place and engaged in operating position by the solenoid extension. The valve or plunger is in closed position so that beer could not be dispensed through the faucet.

Figure 4:
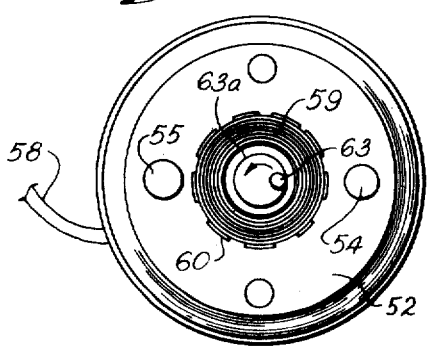

FIG. 4 is a bottom view of the underside of the rotary solenoid seen in FIG. 3 showing the return spring thereof and the engaging extensions and pins of the operating shaft thereof.

Figure 5:
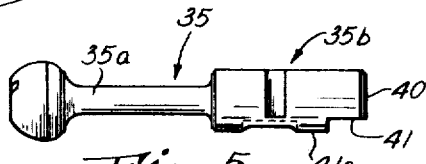

FIG. 5 is a detail side view of the operating plunger for the valve in the same position as seen in FIG. 3.

Figure 6:
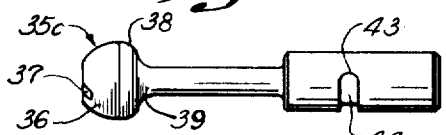

FIG. 6 is a top view of the plunger of valve member of FIG. 5 showing the opening and slot therein for engagement by the solenoid drive pin.

Figure 7:
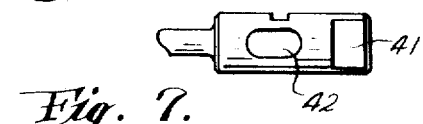

FIG. 7 is a partial view of the operating plunger of FIGS. 5 & 6 taken from directly below whereby to see under side slot or groove therein.

Figure 8:
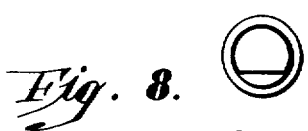

FIG. 8 is an end view of the plunger of FIGS. 5—7, inclusive, looking from the right to the left at the right-hand side of FIG. 5.

Turning to FIG. 3, the internal structure of the basic faucet unit can be seen in more detail. Beer line receiving end 20b has internally serrated opening 21, inwardly of which is positioned a sealing and abutment ring 22 which is received in a recessed groove 23. The inward extension of opening 21, passage 24, narrows to cylindrical shaft 25. Shaft or passage 25 is joined from its lower side by dispensing passage or throat 26.

The upward extension 20c has a relatively enlarged upper throat portion 27 which narrows to cylindrical throat 28, which enters passage 25 from the upper central side thereof. The wall portion 29 of the faucet assembly which carries passageway 25 ends shortly past passageway 28 at 29a. An insert generally designated 30 is received within the right-hand end of passageway 25 in the view of FIG. 3 and away from the beer line connection 20b. This insert has an elongate fitting portion 30a which has two openings in the underside thereof. The latter are to match two small air passages 31 and 32 in the faucet body, the purpose of which is to be described. Insert 30 also has thicker outer end 30d, the inner outside portions of which abut against the faucet body outer end portion 29 in sealing fashion. A plug 33 is provided which seals the end portion 30d of insert 30 and has a shelf 33a extending inwardly thereof for a purpose to be described. An air relief or release opening 34 extends into the end portion 30d of insert 30 underneath the shelf 33a.

Particularly referring now to FIGS. 5—8, inclusive, which show the valve plunger, plunger per se or opening and closing valve member of the faucet assembly, same may be described as follows.

Generally speaking, there are three basic portions of the plunger. The plunger is generally designated 35. Plunger 35 has a lesser outer diameter shaft portion 35a intermediate the ends thereof. A roughly cylindrical greater outer diameter portion 35b is formed or shaped or provided at the outer end of the plunger 35, that is, away from the beer line connection. On the inner end of the plunger 35 there is provided a valve sealing or valve-closing head generally designated 35c. Head 35c has a metal outer portion 36 with a central slot or keyway 37 formed therein. A rubber-sealing gasket or O-ring 38 is provided between the head portion 36 and a flanged or bell-shaped portion 39 of shaft 35a.

Turning to the cylindrical outer end portion 35b of the plunger or valve member, the front or outer end thereof 40 is flat. The underside of the outer end thereof is notched as at 41 with a flat upper face on the notch to overlie and fit against the shelf 33a seen in FIG. 3 or plug 33. The underside of cylindrical portion 35b has a groove or slot 42 of sufficient width and length to have the forward end thereof at least partially overlie and connect with opening 32 when the valve or plunger is in the closed position of FIG. 3 and as well overlie and connect with passage 31 when in said position. On the upper side of cylindrical portion 35b there is provided a groove or slot 43 which is rounded at its inward end and has vertical walls extending down to floor 44 which immediately overlies, in a portion thereof, groove or slot 42.

This groove 43 is to receive the pin of the solenoid to be described in a manner to be described.

Referring to the upwardly extending member 20c on the faucet proper, the externally threaded upper portion thereof is engaged by an internally threaded encircling connecting portion 45 of a solenoid receiving platform generally designated 46. Immediately above engaging portion 46, there is provided enlarged throat or passageway 47 which receives sealing member 48 thereon for a purpose to be described. A further enlarged passageway 49 is provided which opens out the upper face of the solenoid platform 46. The peripheral edge of the solenoid platform 46 is externally threaded as at 50 whereby to receive a cover or cap which seals the solenoid from fluids or the like (not shown). The upper flat surface of the solenoid platform 46 is numbered 51 and receives the lower flat face 52 in flush abutment of the solenoid (generally designated 53). A pair of downwardly extending posts or lugs 54 and 55 are provided which are received in appropriately sized openings 56 and 57 (FIG. 3). The lugs of posts 54 and 55 are of different outer diameter whereby the solenoid may be positioned in only one (the correct) position on the platform. The fit in these openings is a friction-sliding fit for precise and accurate action of the solenoid. Solenoid 53 has conventional electrical power source 58 connected thereto and a return spring 59 on the underside thereof received within retaining lugs 60. Downwardly extending rotatable shaft portion 61 has a lesser diameter extension 62 therebelow which fits in seal 48 in rotatable, yet sealing fashion. Fastened to the lower end of extension 62 is a peg or member 63, cylindrical in shape, which is so sized as to fit in sliding, friction engagement with slot 43 of the plunger 35. The underside view of FIG. 4 shows extension 63 in the forward position of FIG. 3, with plunger 35 closing off the faucet. The arcuate arrow in FIG. 4 shows the direction of rotation of the peg 63 in the view. Comparison of the views of FIGS. 1, 3 and 4 shows how peg 63 engages slot 43 and may, upon approximately 90 to 120° rotation, upon signal actuation of the solenoid, move the plunger 35 to the left in the view of FIG. 3 whereby, at the left end thereof, to open the faucet for the input of the beer from the beer line connection end 20b, and simultaneously, mask off opening 32, while retaining opening 31 within the slot 42. The return spring 59, upon release of the signal to the electromagnet of the solenoid, returns the peg 63 to the view position of FIG. 4 and that of FIG. 3. The air release opening 34 under platform 33a permits the draw in and release of air in the friction-type sliding piston or plunging action of the plunger, while the portion 42a of the plunger is of sufficient breadth and length to always mask opening 32 and also prevent any air from the opening 34 getting to opening 31.

Referring to the function of the described faucet and application, it is assumed that the left end of the faucet assembly seen in FIGS. 1, 2 and 3 is coupled to a beer line by suitable conventional connectors whereby the externally threaded portion 20b is engaged by an internally threaded coupling and the faucet assembly on the line. The solenoid 53 is connected by its power cable or cord 58 to any suitable source of 24 volt electrical power so that the electromagnet therein may receive suitable electrical impulses to power the solenoid and rotate shaft 61 against the return spring 59 to the desired extent or arcuate travel, here, typically, from 90 to 120°, as previously noted. The solenoid platform 46 is screwed or threaded down on external threads 20c whereby seal 48 seats firmly against the upper lip of extension 20c and solenoid 53 is socketed and emplaced on the platform as seen in FIG. 3. This means that the spring 59 and retainers 60 are within the well 49, out of contact with the walls thereof, extension 61 is within the same passage and extending downwardly into passage 47, but still out of contact with the walls thereof, and, second extension 62 passes through the opening in seal 48 in fluid-sealing fashion, yet permitting rotation under the power of the solenoid. Pin or member 63 is extended into slot 43 as seen in FIG. 3.

The abutment of rubber ring 38 against the lip between the passages 24 and 25 in the faucet body seals the faucet against the inward flow of beer into passage 25 and out faucet passage 26. There is an air flow connection between openings 32, 31 and passage opening 26 whereby any beer which is trapped around the shaft portion 35a in passage 25 and inward of the cylindrical portion 35b may flow out the faucet 26 without retention in the faucet. The face 41 of the underside of cylindrical portion 35b lies in friction yet sliding contact with upper side of shelf 33a whereby to prevent any turning of the plunger 35 upon actuation in opening or closing of the valve in the faucet on actuation and return of the solenoid pin 63.

When the bartender desires to draw a glass or pitcher of beer, he pushes the appropriate button or switch in the existent signal system, which permits current to flow to the electromagnet in the solenoid. This causes movement of the pin 63 according to arrow 63a of FIG. 4. In the view of FIG. 3, the pin moves toward the observer, as well as to the left in the view. The plunger 35 is moved to the left in the view of FIG. 3, unseating rubber ring 38 from its seal lip on the internal passageway of the faucet. Beer then may flow in from the left in the view of FIG. 3 and into the faucet passage 26. At this point, the slot 42 has moved from its overlying position with respect to passage 32 in FIG. 3 whereby no outer air comes into the faucet and all impetus to the beer comes from the carbon dioxide and pressure thereon in the lines and barrel according to the dispensing system being used. Beer then flows as long as the valve is open and ring 38 is unseated from the inside of the faucet. The motion, in the view of FIG. 3 is insufficient, of plunger 35, to unseat face 41 entirely from platform 33a whereby the plunger is at all times axially oriented, that is, it does not turn around its longitudinal axis.

When the timer in the selector system stops current flow to the electromagnet of the solenoid or when the bartender takes his finger off the button permitting current to go to the solenoid, if such system is used, the return spring 59 rotates shafts 61 and 62 in the opposite direction from the arrow in FIG. 4 whereby to return pin 63 to the position seen in FIG. 3. This returns plunger 35 to the position of FIG. 3 with the beer flow stopped by rubber ring 38 and the slot 42 opening both of passages 32 and 31 so excess beer in the passageway may drain out the faucet. Air has inspirated and expirated from opening 34 into the plugged end of the faucet when the plunger moved to the left on opening of the valve and expirated therefrom on closing of the valve as the cylindrical portion 35b moves to the right in the view of FIG. 3.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A beer-dispensing faucet comprising:
   a faucet body having an elongate, hollow passageway therein closed at one end and open at the other end for the input of beer;
   a hollow spigot fixed to the underside of said body intermediate its length to provide in combination with said passageway a flow passage for discharging beer through said spigot;
   an elongate valve plunger received within said passageway, said plunger having a greater diameter forward portion at one end thereof received in sliding fit within said passageway, a lesser diameter shaft portion intermediate the ends of said plunger, and a valve plug on the rearward end thereof;
   a solenoid connected to said faucet body;
   a power connection between the solenoid and the forward portion of said plunger whereby actuation of said solenoid moves said valve plunger in reciprocal fashion within said passageway between a closed position in which said valve plug blocks said passageway to prevent the input of beer therein and an open position in which said valve plug frees said passageway to permit the input of beer therein;
   said forward portion of said plunger having an overlying shelf formed on the underside thereof and the closed end of said passageway having an underlying shelf formed therein which cooperatively engages said overlying shelf to prevent turning of said valve plunger around its longitudinal axis; and
   vent means cooperating between said faucet body, spigot and valve plunger to permit airflow into said flow passage when said plunger is at said closed position and to prevent airflow into said flow passage when said valve plunger is at said open position.

2. A faucet as in claim 1 wherein the power connection between the solenoid and the plunger comprises a rod from the operating shaft of the solenoid removably inserted in a slot in one side of the plunger forward portion.

3. A faucet as in claim 1 wherein the solenoid is removably mounted on a platform supported on a hollow tube extending upwardly from and communicating into the hollow faucet body, the solenoid operating shaft extends downwardly into the hollow tube for engagement with the valve plunger and a beer seal slidingly fits circumferentially around said shaft.